Figure 1:
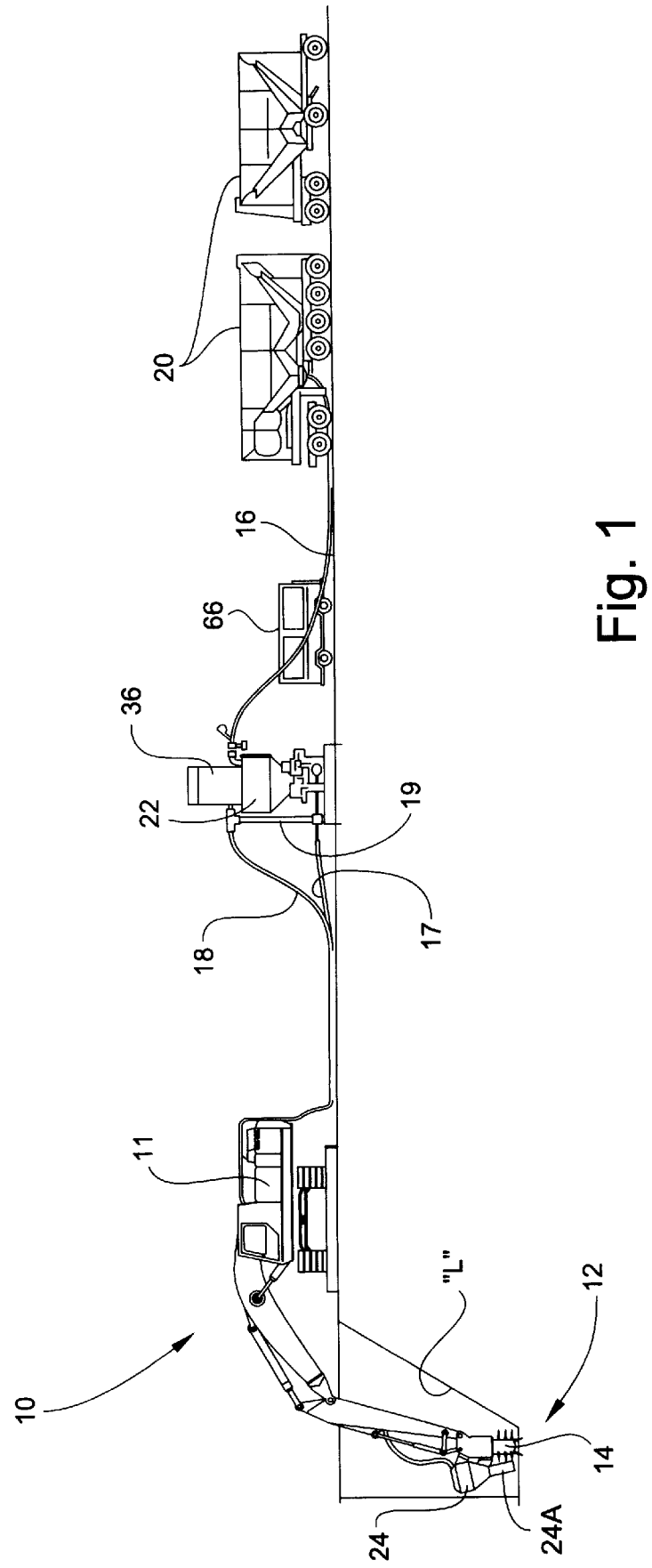

United States Patent
Curtis et al.

[19]

[11] Patent Number: 6,152,656
[45] Date of Patent: Nov. 28, 2000

[54] MATERIAL DELIVERY SYSTEM

[75] Inventors: Don V. Curtis, Monroe, Mich.;
William V. Rollins, Mooresville, N.C.;
Edward J. Labus, Ann Arbor, Mich.

[73] Assignee: J. A. Jones Environmental Services Company, Monroe, Mich.

[21] Appl. No.: 09/075,711

[22] Filed: May 11, 1998

Related U.S. Application Data

[60] Provisional application No. 60/050,189, Jun. 19, 1997.

[51] Int. Cl.$^7$ ................................................. B65G 51/36
[52] U.S. Cl. .................................. 406/34; 406/43; 406/40; 406/124; 406/125; 406/136; 406/137; 406/166; 406/196; 37/307; 37/395
[58] Field of Search ................................. 406/34, 39, 40, 406/43, 124, 125, 136, 137, 166, 196; 37/307, 395, 396, 397

[56] References Cited

U.S. PATENT DOCUMENTS

| | | | |
|---|---|---|---|
| 4,067,622 | 1/1978 | Krambrock et al. | 406/85 |
| 4,718,796 | 1/1988 | Shiers et al. | 406/34 |
| 4,769,977 | 9/1988 | Milbourn . | |
| 4,906,142 | 3/1990 | Taki et al. . | |
| 5,013,185 | 5/1991 | Taki . | |
| 5,028,010 | 7/1991 | Sansing . | |
| 5,035,543 | 7/1991 | Medemblik et al. | 406/39 |
| 5,069,243 | 12/1991 | Foreman | 137/205 |
| 5,127,765 | 7/1992 | Millgard . | |
| 5,135,058 | 8/1992 | Millgard et al. . | |
| 5,212,891 | 5/1993 | Schuermann et al. | 37/323 |
| 5,256,001 | 10/1993 | Millgard . | |
| 5,353,998 | 10/1994 | Sansing . | |
| 5,368,415 | 11/1994 | Kono et al. . | |
| 5,378,085 | 1/1995 | Kono et al. . | |
| 5,417,522 | 5/1995 | Kono et al. . | |
| 5,738,022 | 4/1998 | Reilly | 110/165 R |
| 5,765,965 | 6/1998 | Carter, Jr. et al. | 405/129 |
| 5,794,866 | 8/1998 | Shinn | 241/101.72 |

FOREIGN PATENT DOCUMENTS

WO 95/06401  3/1995  WIPO .

OTHER PUBLICATIONS

"The Enreco Hydro Injection System"; Enreco Inc.; pp. 3–7; Published prior to Jun. 19, 1997.
"MecTool—A Revolutionary Patented System for In Situ Remediation"; Millgard Environmental Corporation; Entire Brochure; Published prior to Jun. 19, 1997.
"S.M.W. Cutoff Wall Technique for Containment of Hazardous Waste"; S.M.W.; Seiko, Inc.; pp. 10–11; Published prior to Jun. 19, 1997.
"Twin Header Blender—Toxic Waste Warrior"; Mitsui Machinery Distribution, Inc.; Entire Brochure; Published prior to Jun. 19, 1997.
"Slashbuster Excavator Mounted Stirring Attachment"; D & M Machine Division, Inc.; Entire Brochure; Published prior to Jun. 19, 1997.
"Technical Specifications for ITEX Heavy Duty In–Situ Mixing/Processing Equipment"; ITEX Environmental Services, Inc.; Entire Brochure; Published prior to Jun. 19, 1997.

*Primary Examiner*—Christopher P. Ellis
*Assistant Examiner*—Jeffrey A. Shapiro
*Attorney, Agent, or Firm*—Adams, Schwartz & Evans, P.A.

[57] ABSTRACT

A material delivery system conveys material from a supply location at or above an area surface to a working location below the area surface. The delivery system includes a supply hopper located at the supply location and having an inlet for receiving material to be conveyed and an outlet for discharging material. An injection hopper is adapted for mounting on a movable working arm of a self-propelled vehicle, and has an inlet for receiving material and an outlet for discharging material. The arm of the vehicle carries the injection hopper below the area surface to the working location. A supply line is connected to the outlet of the supply hopper and to the inlet of the injection hopper for conveying material from the supply location to the working location.

17 Claims, 4 Drawing Sheets

MATERIAL DELIVERY SYSTEM

This application claims benefit to provisional application 60/050,189 filing date Jun. 19, 1997.

TECHNICAL FIELD AND BACKGROUND OF THE INVENTION

This invention relates to a material delivery system applicable in the environmental treatment of solid, semisolid, and liquid waste. Such waste is commonly generated as a by-product of industrial plants, and then stored in man-made sludge lagoons for later processing. The invention conveys sludge-hardening reagent from a supply location at or above the sludge surface to a working location below the surface in the lagoon. A rotating mixer assembly blends the reagent and sludge together. The resulting mixture reacts causing the lagoon to harden sufficient for supporting trucks and other vehicles. After treatment, the solidified lagoon can be capped with a protective layer and used as a parking lot, equipment storage area, or the like.

According to one prior art waste treatment system, an industrial excavator including rotating tines 5–15 feet long is used for injecting and blending a reagent slurry below the surface into a waste lagoon. Unlike the present invention, this system is inapplicable for pneumatically conveying dry reagent from a supply location at or above the surface to a working location below the surface. Moreover, the prior art system does not include a reagent storage container attached directly to the stick of the excavator and adapted for being carried downwardly into the lagoon to treat the lagoon from the bottom up.

Other prior art waste treatment systems employ an excavator with a mixing assembly mounted on the stick and a remote reagent delivery source. These system are generally incapable of properly supplying and controlling reagent delivery to the specific area being treated. Such problems typical result in treated areas having non-uniform hardness and consistency.

SUMMARY OF THE INVENTION

Therefore, it is an object of the invention to provide a reagent delivery system which injects a controlled amount of reagent below the surface directly to an area being treated.

It is another object of the invention to provide a reagent delivery system which results in treated areas of uniform hardness and consistency.

It is another object of the invention to provide a reagent delivery system which controls the release of chemical dust to the atmosphere during mixing.

It is another object of the invention to provide a reagent delivery system which is capable of conveying dry reagent from a supply location above the sludge surface to a working location below the sludge surface.

It is another object of the invention to provide a reagent delivery system which allows precise measurement and monitoring of reagent injected into the lagoon.

It is another object of the invention to provide a reagent delivery system which is computerized and programmable for automatic operation.

It is another object of the invention to provide a reagent delivery system which includes an alarm system for indicating operational breakdowns.

It is another object of the invention to provide a reagent delivery system which is operable in temperatures as cold as −30 degrees F.

It is another object of the invention to provide a reagent delivery system which is operable in other adverse whether conditions, such as heavy rain and snow.

It is another object of the invention to provide a reagent delivery system which uses portable equipment for allowing relocation of the system to other project sites.

It is another object of the invention to provide a reagent delivery system which monitors the amount of reagent delivered to a particular area and the total days of production.

It is another object of the invention to provide a reagent delivery system which includes instrumentation for indicating the reagent feed rate during mixing.

These and other objects of the present invention are achieved in the preferred embodiments disclosed below by providing a material delivery system for conveying material from a supply location at or above an area surface to a working location remote from the supply location and below the area surface. The delivery system includes a supply hopper located at the supply location and having an inlet for receiving material to be conveyed and an outlet for discharging material. An injection hopper is adapted for mounting on a movable working arm of a self-propelled vehicle, and has an inlet for receiving material and an outlet for discharging material. The arm of the vehicle carries the injection hopper below the area surface to the working location. A supply line is connected to the outlet of the supply hopper and to the inlet of the injection hopper for conveying material from the supply location to the working location.

According to one preferred embodiment of the invention, a return line is connected to the injection hopper and to the supply hopper for conveying return air and any excess material from the injection hopper back to the supply hopper.

According to another preferred embodiment of the invention, filter means are provided for capturing materials exiting the return line to the supply hopper. The filter means separates materials from a moving air stream through the return line as the air stream is exhausted to the atmosphere.

According to yet another preferred embodiment of the invention, the filter means includes a bag house mounted above the supply hopper. The bag house has an inlet connected to the return line, an exhaust open to the atmosphere, and a filter medium between the inlet and exhaust for capturing materials entrained in the air stream exiting the return line and passing through the bag house to the atmosphere.

According to yet another preferred embodiment of the invention, the filter medium includes a plurality of vertically extending filter bags.

According to yet another preferred embodiment of the invention, a level control is provided for monitoring the level of material contained in the supply hopper.

According to yet another preferred embodiment of the invention, a low level alarm is triggered when the amount of material in the supply hopper reaches a predetermined low level.

According to yet another preferred embodiment of the invention, a hopper valve is located at the outlet of the supply hopper for effecting controlled release of material from the supply hopper to the supply line.

Preferably, the hopper valve is a knife gate valve.

According to yet another preferred embodiment of the invention, a rotary lock valve is located between the hopper valve and supply line for metering the flow of material outwardly from the supply hopper through the hopper valve.

According to yet another preferred embodiment of the invention, a spray nozzle is connected to a fluid tank and adapted for attachment to the working arm of the excavator adjacent the injection hopper for spraying a fluid into an area proximate the working location to control the escape of material above the area surface to the atmosphere.

According to yet another preferred embodiment of the invention, a plurality of bin aerators are located on an interior wall of the supply hopper for generating pulsed jets of air to prevent packing of material at a bottom of the supply hopper.

In another embodiment, a material delivery system is provided for pneumatically conveying dry material from a supply location at or above an area surface to a working location remote from the supply location and below the area surface. The system includes a supply hopper located at the supply location and having an inlet for receiving material to be conveyed and an outlet for discharging material. An injection hopper is mounted on a movable working arm of a self-propelled vehicle, and has an inlet for receiving material and an outlet for discharging material. The arm of the vehicle is adapted for carrying the injection hopper below the area surface to the working location.

A pneumatic supply line is connected to the outlet of the supply hopper and to the inlet of the injection hopper for pneumatically conveying material from the supply location to the working location. A pneumatic return line is connected to the injection hopper and to the supply hopper for pneumatically conveying return air and any excess material from the injection hopper back to the supply hopper.

According to one preferred embodiment of the invention, a pneumatic bypass line is connected to the supply line and the return line for diverting material flow through the supply line back to the supply hopper.

According to another preferred embodiment of the invention, a bypass/supply valve is located at the junction of the supply line and the bypass line for determining the flow of material to the injection hopper.

According to yet another preferred embodiment of the invention, a pneumatic blower communicates with the supply line for pneumatically charging the supply line.

According to yet another preferred embodiment of the invention, the supply and return lines are 4-inch diameter material handling hoses.

In another embodiment, a material delivery system includes a supply hopper located at the supply location and having an inlet for receiving material to be conveyed and an outlet for discharging material. The system further includes a self-propelled vehicle having a movable working arm adapted for reaching below the area surface to the working location. An injection hopper is mounted on the movable working arm of the vehicle, and has an inlet for receiving material and an outlet for discharging material. The arm of the vehicle being adapted for carrying the injection hopper below the area surface to the working location. A supply line is connected to the outlet of the supply hopper and to the inlet of the injection hopper for conveying material from the supply location to the working location.

According to another preferred embodiment of the invention, a mixer assembly is mounted on a free end of the working arm of the vehicle for blending material exiting the injection hopper into an area surrounding the working location.

According to yet another preferred embodiment of the invention, the mixer assembly includes at least one mixer drum.

An embodiment of the method according to the invention includes the steps of pneumatically conveying dry waste treatment material from a supply location at or above an area surface to a working location below the area surface. The material is then injected directly into an area proximate the working location. The material and waste are then mixed together below the area surface in the working location. The waste lagoon is solidified as a result of the reaction between the material and waste, such that the resulting load carrying capacity of the lagoon is at least 25 psi.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 1 is a environmental view of the reagent delivery system according to one preferred embodiment of the present invention;

FIGS. 2–6 are plan and elevational views of the skid-mounted supply hopper; and FIG. 7 is a schematic view illustrating operation of the reagent delivery system.

DESCRIPTION OF THE PREFERRED EMBODIMENT AND BEST MODE

Referring now specifically to the drawings, a reagent delivery system according to the present invention is illustrated in FIG. 1 and shown generally at reference numeral 10. The delivery system 10 employs a standard industrial excavator 11, such as the CAT 375L manufactured by Caterpillar, Inc. of Aurora, Ill., for delivering dry reagent below the surface of a sludge lagoon "L". The dry reagent is a mixture of fly ash and cement which reacts with the sludge waste to solidify the lagoon "L". The ratio of fly ash to cement is about 1:1 or 1:2 depending on the moisture content of the area to be treated. The excavator 11 includes direct reading pressure and flow gauges, a computerized depth/grade and slope recorder and indicator system, and has laser target and laser survey capabilities. The total length of the boom and stick of the excavator 11 is between 30–40 feet.

A mixer assembly 12 is pivotably mounted on the stick of the excavator 11 and includes a pair of spaced, axial, counter-rotating drums 14 which cooperate to mix the dry reagent with the sludge waste. A single lagoon "L", for example, may have a surface area of about 35 acres and a depth of 30 feet. The consistency of the sludge contained in the lagoon "L" ranges from liquid to solid. Once treated with reagent the lagoon "L" solidifies and is capable of supporting trucks and other industrial vehicles. The resulting load carrying capacity is preferably at least 25 psi. The cure time of the reagent/sludge mixture is approximately 7 to 21 days.

A number of 4-inch diameter hose lines 16, 17, 18, and 19 defining a pneumatic circuit convey reagent from delivery trailers 20 to a skid-mounted supply hopper 22 to an injection hopper 24 mounted on the stick of the excavator 11 adjacent the mixer drums 14. The excavator 11 carries the injection hopper 24 into the lagoon "L" where it augers a predetermined amount of dry reagent from an injection chute 24A directly to an area proximate the rotating mixer drums 14. The injection hopper 24 is sealed to store and the reagent below the sludge surface, keeping the reagent dry prior to its injection into the sludge. From the injection hopper 24, return air and any excess reagent is pneumatically conveyed back to the supply hopper 22 where the air is filtered and the reagent recycled.

The delivery line 16 is connected at one end to the trailer 20 and at the opposite end to the supply hopper 22 at a connection coupling 23. A pneumatic blower (not shown) conveys reagent from the trailer 20 to the supply hopper 22. The supply line 17 is connected to a T-fitting 26 at an outlet formed in the bottom of the supply hopper 22, and communicates with a second pneumatic blower 28 mounted on the skid adjacent the supply hopper 22. A hopper valve 32 dispenses reagent from the supply hopper 22 to a rotary lock valve 34 which meters the amount of reagent passed to the T-fitting 26. The blower 28 charges the supply line 17 and conveys the reagent from the T-fitting 26 to the injection hopper 24 mounted on the stick of the excavator 11.

Figure 6:
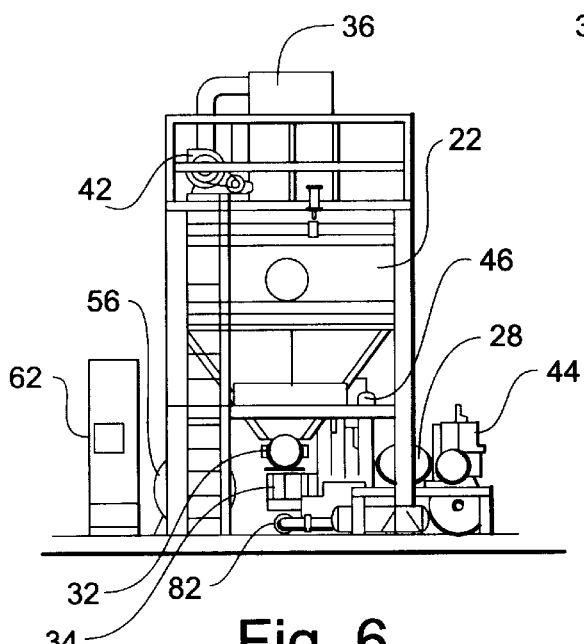

The return line 18 is connected at one end to the injection hopper 24 and at an opposite end to a bag house 36 mounted directly above an inlet to the supply hopper 22. The bag house 36 includes a number of vertically extending filter bags 38 which operate to capture reagent entrained in the air moving through the pneumatic return line 18. The reagent collects on the filter bags 38 and falls back into the supply hopper 22. A blower 42 communicates with the bag house 36 to maintain negative air pressure on the filter bags 38. A compressor 44 and air dryer 46 supply purge air to the bag house 36, and cooperate to continuously dry and clean the filter bags 38 during operation of the delivery system 10. Filtered, clean air is exhausted from the bag house 36 to the atmosphere through an exhaust opening in the blower 42 (See FIG. 6).

For added dust control, the delivery system 10 further includes a spray nozzle 52 attached to the boom of the excavator 11 and connected to a water line 54 extending to a water tank 56 mounted on the skid. The water spray is turned on, as needed, to reduce the amount of surface dust generated by the delivery system 10 as reagent is pumped into the sludge lagoon "L".

Figure 2:
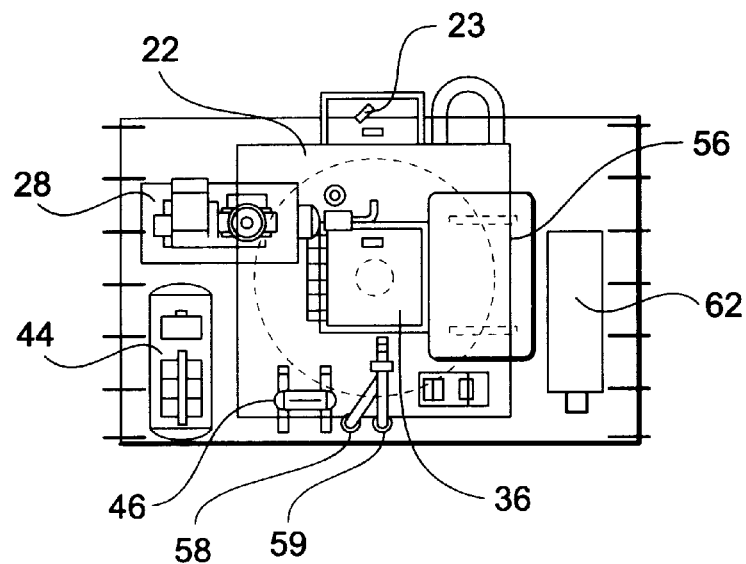
Figure 3:
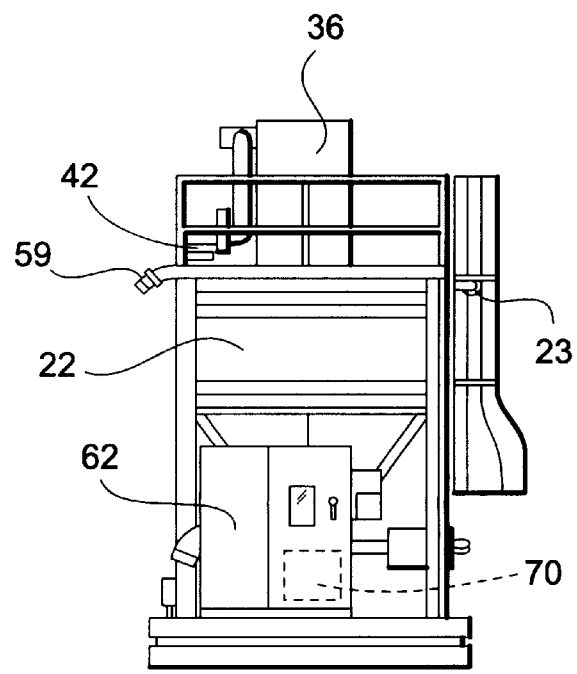
Figure 4:
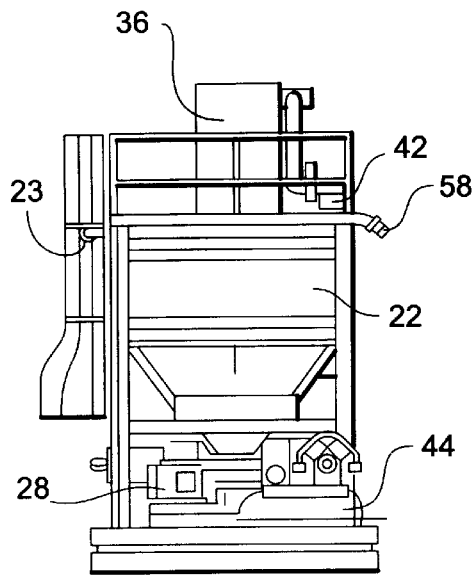
Figure 5:
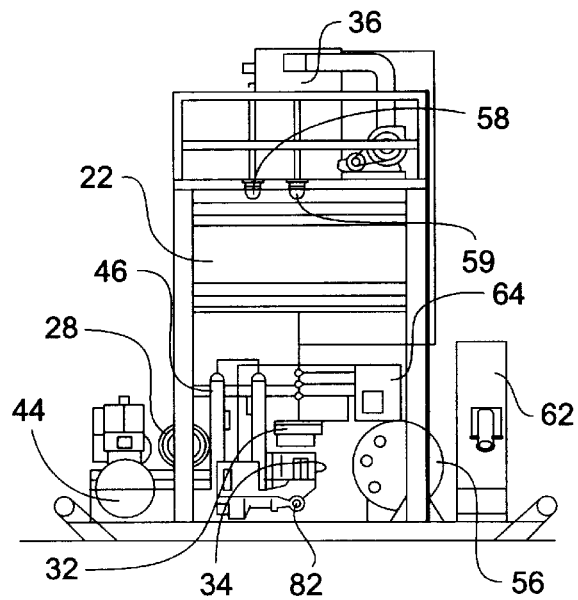

The bypass line 19 is connected to the supply line 17 at one end downstream of the T-fitting 26 and at an opposite end to the bag house 36. The connection couplings for the bypass line 19 and the return line 18 to the bag house 36 are best shown in FIGS. 2, 3, and 4 at numerals 58 and 59, respectively.

Operation of the reagent delivery system 10, as described in detail below, is controlled by an operator at the supply hopper 22 or by a remote operator in the cab of the excavator 11. A control panel housing 62 is mounted adjacent the supply hopper 22, and includes all electrical switches and buttons for activating the system 10. A solenoid enclosure 64 adjacent the control panel housing 62 contains solenoids for actuating flow control valves. A generator 66 supplies the necessary electrical power to operate the system 10.

Operation of the Reagent Delivery System 10

Figure 7:
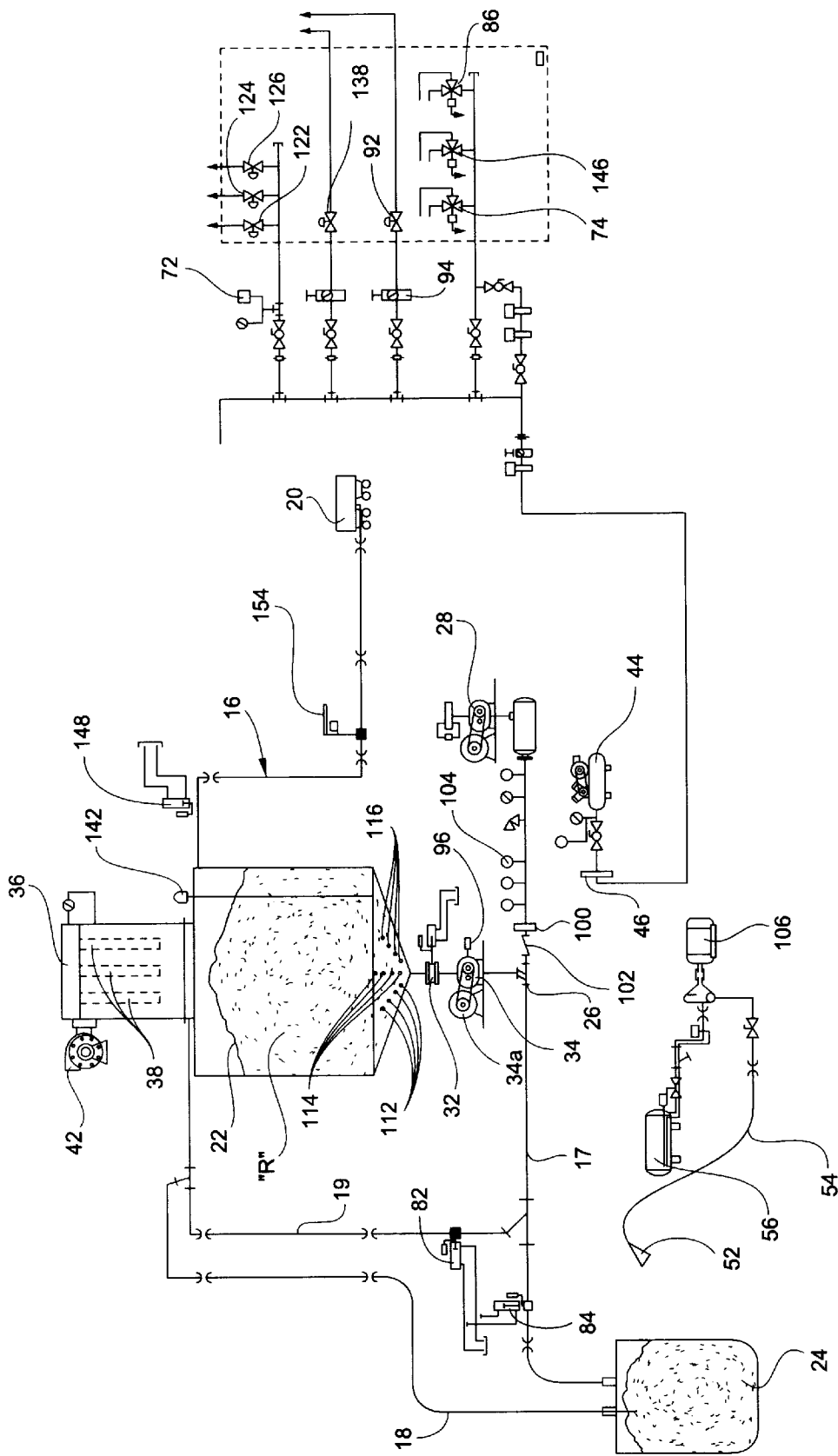

Referring now to FIG. 7, to begin operation of the delivery system 10, the operator turns a main control panel circuit breaker and control power selector switch to the ON position, and pushes a system AUTO-START button on the control panel housing 62. This activates the bag house blower 42 and a PLC computer control unit 70 (See FIG. 3) contained in the panel housing 62. An electrical low pressure switch 72 closes, and remains closed provided pneumatic pressure generated by the bag house blower 42 is maintained at or above 70 psig. Digital output from the PLC control unit 70 to solenoid valve 74 closes the hopper valve 32 at the supply hopper outlet. Valves 82 and 84 at the junction of bypass line 19 and supply line 17 are opened to the bypass position by solenoid valve 86.

The PLC control unit 70 verifies the position of bypass/supply valves 82 and 84, and provides digital output to energize the blower 28 and pneumatically charge the circuit. This illuminates a BLOWER ON pilot light, and prompts the operator to turn a REMOTE PANEL POWER selector switch to the ON position. Air flow generated by the blower 28 is directed initially through the bypass line 19 and exhausted from the bag house 36 to the atmosphere. The hopper valve 32 remains closed.

To begin the flow of reagent "R", the operator selects the desired feed rate and pushes a FEEDER ON push button. Digital output from the PLC control unit 70 to solenoid valve 86 stops and allows bypass/supply valves 82 and 84 to move to the supply position. Digital input to the PLC control unit 70 verifies movement of valves 82 and 84 to the supply position. Rotary lock valve motor 34A is energized. Solenoid valve 92 is actuated seconds prior to operation of rotary lock valve 34. Air regulator 94 regulates air flow to purge the rotary lock valve 34. A proximity switch 96 verifies operation of the rotary lock valve 34 and relays this information to the PLC control unit 70. The PLC control unit 70 provides digital output to solenoid valve 74 causing the hopper valve 32 to open.

Reagent "R" flows from the hopper valve 32 through the rotary lock valve 34 to the T-fitting 26 where it enters the supply line 17. As reagent passes through the T-fitting 26, pneumatic pressure in the supply line 17 increases to approximately 8–12 psig. This causes pressure switch 100 to energize. Digital output from the pressure switch 100 to the PLC control unit 70 instructs the system 10 to continue operating. A check valve 102 prevents reverse flow to the blower 28. A high pressure switch 104 set at approximately 13 psig and adjustable to 15 psig provides a safety purge mechanism. As long as no digital input is received from pressure switch 104 to the PLC control unit 70 indicating a high pressure level, the system 10 will continue normal operation.

During operation, reagent "R" is conveyed through the supply line 17 to the injection hopper 24 where it is augured-out from the injection chute 24A below the sludge surface to an area proximate the rotating mixer drums 14. The air return line 18 captures excess reagent and conveys it back to the bag house 36, as described above. The water spray nozzle 52 attached to the boom of the excavator 11 sprays water pumped by motor 106 from the water tank 56 and through the water line 54 to the excavator 11. The water spray controls surface dust generated during operation of the delivery system 10.

Should pressure level in the supply line 17 reach or exceed 13 psig, high pressure switch 104 triggers an alarm circuit causing the hopper valve 32 to close and the rotary lock valve 34 to stop. As the supply line 17 purges, pressure switch 100 de-energizes causing movement of the bypass/supply valves 82 and 84 to the bypass position and diverting air flow through the bypass line 19 and bag house 36 to the atmosphere. The system 10 remains in the bypass state until the line clog or other failure is found and the alarm cleared.

To avoid packing of reagent "R" at the bottom of the supply hopper 22, a number of bin aerators 112, 114, and 116 are arranged in zones A, B, and C adjacent the conical interior wall of the hopper 22. Solenoid valves 122, 124, and 126 control operation of the bin aerators 112, 114, and 116, and are actuated in sequence to create pulsed jets of air. Solenoid valves 122, 124, and 126 are preferably actuated in the following manner with the hopper valve 32 in the open position:

Cycle 1: Solenoid Valve 122 open 0.5 seconds/closes 2 seconds for one minute cycle;

Cycle 2: Solenoid valve 124 open 0.5 seconds/closed 2 seconds for one minute cycle; and Cycle 3: Solenoid valve 126 open 0.5 seconds/closes 2 seconds for one minute cycle.

This above sequence is repeated continuously during operation of the delivery system 10.

To stop the flow of reagent "R", the operator pushes a FEEDER STOP push button. This closes the hopper valve 32 and stops rotation of the rotary lock valve 34. Solenoid valve 92 remains actuated seconds after operation to keep the rotary lock valve 34 open for purging. The supply line 17 purges causing the pressure switch 100 to deenergize. Bypass/supply valves 82 and 84 actuate to the bypass position and divert air flow through the bypass line 19 and bag house 36 to the atmosphere. Solenoid valve 138 keeps other valves open for purging after operation of delivery system 10 is stopped.

Filling the Supply Hopper

In order to maintain operation of the delivery system 10, the supply hopper 22 must include a predetermined minimum level of reagent "R". A level control 142 monitors the amount of reagent "R" in the supply hopper 22 and activates a low level alarm when the reagent level reaches the minimum required for normal operation. At predetermined high and low levels, the level control 142 causes the delivery system 10 to shut down by moving the bypass/supply valves 82 and 84 to the bypass position and closing the hopper valve 32, as described above.

Upon activation of the low level alarm, the PLC control unit 70 sends digital output to solenoid valve 146 which opens fill valve 148. The operator opens manual valve 154 and turns on the trailer blower (not shown) to begin delivery of reagent "R" to the supply hopper 22.

When the reagent level reaches a "High Level" set point on the level control 142, digital input to the PLC control unit 70 triggers an audible and visual alarm prompting the operator to stop delivery of reagent "R" to the supply hopper 22. The operator closes manual valve 154 which signals the PLC control unit 70 to close fill valve 148. If the hopper 22 continues to receive reagent "R" and the level reaches a "Very High Level" set point on the level control 142, the PLC control unit 70 will automatically send digital output to solenoid valve 146 which closes fill valve 148.

A material delivery system 10 is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A material delivery system for conveying material from a supply location at or above an area surface to a working location below the area surface, said delivery system comprising:

(a) a supply hopper located at the supply location and having an inlet for receiving material to be conveyed and an outlet for discharging material;

(b) an injection hopper for being mounted on a movable working arm of a self-propelled vehicle, and having an inlet for receiving material and an outlet for discharging material, the arm of the vehicle being adapted for carrying said injection hopper below the area surface to the working location, and said injection hopper including an elongate injection chute formed at said outlet thereof for delivering material exiting said injection hopper into a predetermined target area of the working location;

(c) a supply line connected to the outlet of said supply hopper and to the inlet of said injection hopper for conveying material from the supply location to the working location;

(d) a mixer assembly adapted for being mounted on a free end of the working arm of the vehicle proximate said injection chute for blending the material exiting said injection hopper into the predetermined target area of the working location; and (e) a return line connected to the injection hopper and to the supply hopper for conveying return air and excess material from the injection hopper back to the supply hopper.

2. A material delivery system according to claim 1, and further comprising filter means for capturing materials exiting the return line to the supply hopper, and separating materials from a moving air stream through the return line as the air stream is exhausted to the atmosphere.

3. A material delivery system according to claim 2, wherein said filter means comprises a bag house mounted above the supply hopper, and having an inlet connected to said return line, an exhaust open to the atmosphere, and a filter medium between the inlet and exhaust for capturing materials entrained in the air stream exiting the return line and passing through the bag house to the atmosphere.

4. A material delivery system according to claim 3, wherein said filter medium comprises a plurality of vertically extending filter bags.

5. A material delivery system according to claim 1, and further comprising a level control for monitoring the level of material contained in the supply hopper.

6. A material delivery system according to claim 1, and comprising a hopper valve at the outlet of said supply hopper for effecting controlled release of material from said supply hopper to said supply line.

7. A material delivery system according to claim 6, and further comprising a rotary lock valve located between the hopper valve and supply line for metering the flow of material outwardly from the supply hopper through the hopper valve.

8. A material delivery system according to claim 1, and further comprising a spray nozzle connected to a fluid tank and adapted for attachment to the working arm of the excavator for spraying a fluid into an area proximate the working location to control the escape of material above the area surface to the atmosphere.

9. A material delivery system according to claim 1, and further comprising a plurality of bin aerators located on an interior wall of said supply hopper for generating pulsed jets of air to prevent packing of material at a bottom of the supply hopper.

10. A material delivery system for pneumatically conveying dry material from a supply location at or above an area surface to a working location below the area surface, said delivery system comprising:

(a) a supply hopper located at the supply location and having an inlet for receiving material to be conveyed and an outlet for discharging material;

(b) an injection hopper for being mounted on a movable working arm of a self-propelled vehicle, and having an inlet for receiving material and an outlet for discharging material, the arm of the vehicle being adapted for carrying said injection hopper below the area surface to the working location, and said injection hopper including an elongate injection chute formed at said outlet thereof for delivering material exiting said injection hopper into a predetermined target area of the working location;

(c) a pneumatic supply line connected to the outlet of said supply hopper and to the inlet of said injection hopper for pneumatically conveying material from the supply location to the working location;

(d) a pneumatic return line connected to the injection hopper and to the supply hopper for pneumatically conveying return air and excess material from the injection hopper back to the supply hopper; and (e) a mixer assembly adapted for being mounted on a free end of the working arm of the vehicle proximate said injection chute for blending the material exiting said injection hopper into the predetermined target area of the working location.

11. A material delivery system according to claim 10, and further comprising a pneumatic bypass line connected to the supply line and the return line for diverting material flow through the supply line back to the supply hopper.

12. A material delivery system according to claim 11, and further comprising a bypass/supply valve at the junction of said supply line and said bypass line for determining the flow of material to the injection hopper.

13. A material delivery system according to claim 10, and further comprising a pneumatic blower communicating with said supply line for pneumatically charging said supply line.

14. A material delivery system according to claim 10, wherein said supply and return lines comprise 4-inch diameter material handling hoses.

15. A material delivery system for conveying material from a supply location at or above an area surface to a working location below the area surface, said delivery system comprising:

(a) a supply hopper located at the supply location and having an inlet for receiving material to be conveyed and an outlet for discharging material;

(b) a self-propelled vehicle including a movable working arm adapted for reaching below the area surface to the working location;

(c) an injection hopper mounted on the movable working arm of said vehicle, and having an inlet for receiving material and an outlet for discharging material, the arm of said vehicle being adapted for carrying said injection hopper below the area surface to the working location, and said injection hopper including an elongate injection chute formed at said outlet thereof for delivering material exiting said injection hopper into a predetermined target area of the working location;

(d) a supply line connected to the outlet of said supply hopper and to the inlet of said injection hopper for conveying material from the supply location to the working location; and (e) a mixer assembly mounted on a free end of the working arm of the vehicle proximate said injection chute for blending the material exiting said injection hopper into the predetermined target area of the working location.

16. A delivery system according to claim 12, wherein said mixer assembly comprises at least one mixer drum.

17. A method of environmentally treating a sludge waste lagoon containing areas of semi-solid and liquid waste, comprising the steps of:

(a) pneumatically conveying dry waste treatment material from a supply location at or above an area surface to a working location below the area surface;

(d) injecting the waste treatment material directly into an area proximate the working location;

(c) mixing the waste treatment material and waste together below the area surface in the working location; and (d) solidifying the waste lagoon such that the resulting load carrying capacity of the lagoon is at least 25 psi.

* * * * *